Figure 1:
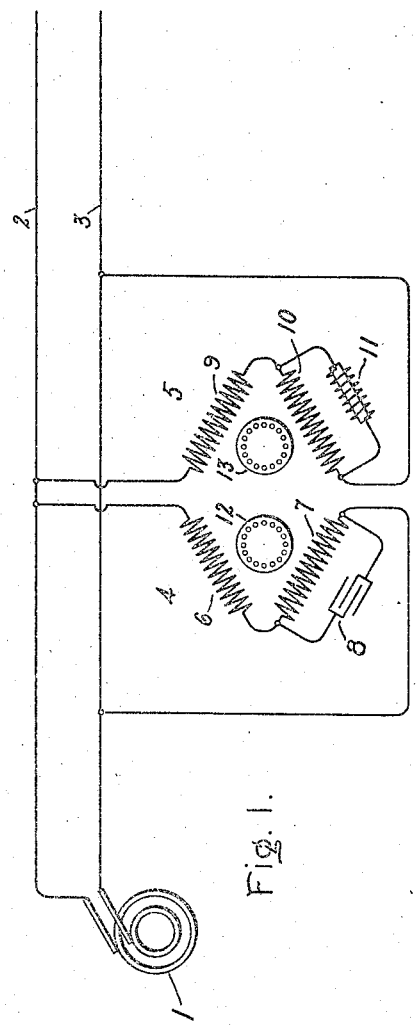

No. 848,925. PATENTED APR. 2, 1907.
E. SCHATTNER.
ELECTRIC GOVERNOR.
APPLICATION FILED OCT. 6, 1904.

Witnesses:

Inventor:
Ernest Schattner,
by
Att'y.

UNITED STATES PATENT OFFICE.

ERNEST SCHATTNER, OF SCHENECTADY, NEW YORK, ASSIGNOR TO GENERAL ELECTRIC COMPANY, A CORPORATION OF NEW YORK.

ELECTRIC GOVERNOR.

No. 848,925.   Specification of Letters Patent.   Patented April 2, 1907.

Application filed October 6, 1904. Serial No. 227,358.

*To all whom it may concern:*

Be it known that I, ERNEST SCHATTNER, a subject of the King of Great Britain, residing at Schenectady, county of Schenectady, State of New York, have invented certain new and useful Improvements in Electrical Governors, of which the following is a specification.

This invention relates to regulators for alternating-current circuits and is adapted to automatically produce the desired regulating effect when the frequency of the alternator changes. It may be used for controlling the speed of a steam-turbine or other prime mover by regulating the quantity of steam supplied when the alternator changes from normal frequency. It may also be used as a governor for water-wheels by regulating the height of the water-gate or for regulating the speed of motors by varying the shunt-field current and for many other purposes of regulation which may be necessary or desirable upon a change of frequency in an alternating circuit. To produce these governing effects on the prime mover or other devices, I make use of two small motors connected across the alternating-current line. The rotors of these motors may be of a form commonly used in induction-motors; but the field-windings are preferably constructed like those of a quarter-phase motor, except that the two windings of each machine are connected in series across the alternating-current line. By the use of reactances in shunt with one field-coil of each machine I change the phase of the current in the coil sufficiently to produce an appreciable torque on the rotor of that machine. By the use of a capacity reactance in shunt with half the field of one machine and an inductive reactance in shunt with half the field of the other machine I am able to make the rotors of the two machines revolve in opposite directions, and by suitably adjusting the relative size of these reactances I am able to make the machines operate at the same speed when the alternator is running at normal frequency. If the frequency of the alternating circuit should increase, due to an increase in speed of the prime mover, one of the motors will increase in speed, while the other motor will decrease in speed, for upon an increase in frequency the effectiveness of the inductive reactance will be increased, while the effectiveness of the capacity reactance will be decreased. Upon a decrease in frequency below the normal value the machine which ran fast on the higher frequency will decrease in speed and the machine which ran slow on the higher frequency will increase in speed. By the use of a differential gear or other similar mechanical means I am able to make use of this relative change in speed of the two machines to increase or decrease the steam-supply to the prime mover or to produce such other acts of regulation as are desired.

Figure 2:
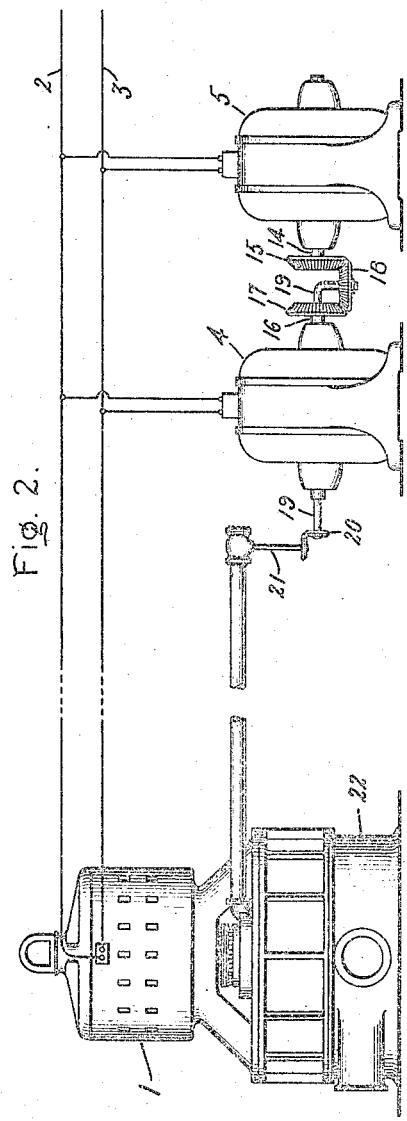

Figure 1 is a diagrammatical representation of the electrical circuits of my improved regulator. Fig. 2 shows the application of my invention for regulating the speed of a steam-turbine, though for convenience of illustration the size of the generating set is greatly reduced in proportion to the other features illustrated.

The alternating-current generator 1, which may be either single phase or polyphase, supplies current to the mains 2 and 3. Motors 4 and 5 are connected between the mains 2 and 3. The field of motor 4 consists of two coils 6 and 7, connected in series, and in shunt with coil 7 is placed the capacity reactance 8. This reactance may be concealed within the casing of the motor or located in any other convenient position. The field of the motor 5 consists of two coils 9 and 10, connected in series, the latter coil being shunted by the inductive reactance 11. The rotors 12 and 13 may be of the ordinary squirrel-cage type commonly used in induction-motors. The shaft 14 of motor 5 carries a bevel-gear 15, and the shaft 16 of motor 4 carries a similar bevel-gear 17. These bevel-gears are of the same size and mesh with the third gear 18, mounted on the shaft 19, which is bent at right angles to the axis of the gear 18 and passes freely through the center of the hollow shaft 16. A bevel-gear 20 is carried on the outer end of the shaft 19 and serves to operate a valve 21 or other suitable mechanism for regulating the speed of the prime mover 22. On normal frequency the reactance 11 has a value sufficient to cause a slight lead in the phase of the current in field-coil 10 with respect to the phase of the current in field-coil 9. This difference in phase between the current in the two coils causes the rotor 13 to rotate in an anticlockwise direction at a definite speed. In motor 4 the capacity reactance 8 in shunt with the field-coil 7 causes a lag of the current in that coil with respect to the current in field-coil 6, so that the rotor 12 revolves in a clockwise direction at a certain speed. Assuming an increase in speed of the prime mover and a consequent increase in frequency on the alternating mains 2 and 3, the lead of the current in coil 10 will be increased, because of the increased reactive power of the inductive reactance 11 when operating on a higher frequency. On the other hand, the increase in frequency causes a decrease in the effectiveness of the capacity reactance 8, and hence the lag of the current in field-coil 7 with respect to the current in field-coil 6 is not as great as it was at normal frequency, thus causing the rotor 12 to revolve at a lower speed. As the rotors of the two motors revolve in opposite directions, an increase in speed of one and a decrease in speed of the other will produce a turning moment on the intermeshing gear 18, and consequently produce a rotation of the shaft 19, thereby altering the supply of steam to the prime mover sufficiently to bring the alternator back to normal speed. Assuming a decrease in frequency below the normal value, the reactance 11 will decrease in effectiveness, and the reactance 8 will increase in effectiveness, thus causing a decrease in the speed of rotor 12 and an increase in the speed of rotor 12. Consequently the turning moment on the intermeshing gear 18 will be in a direction opposite that produced by an increase in frequency, and the valve 21 will be opened and sufficient steam admitted to the prime mover to bring the alternator up to normal speed.

While I have described and illustrated the reactances 8 and 11 as connected in shunt with one field-coil of each motor to produce the splitting of phase in the field-winding, it is well known that this result may be easily produced by other arrangements of the reactance, and while I consider this specific arrangement illustrated as the preferable arrangement I do not wish to be limited thereto.

As the turning moment of shaft 19 is dependent on the relative speed of the gear-wheels 15 and 17, it is not necessary that a change in frequency of the alternating current should produce an increased peripheral speed of one rotor and a decreased peripheral speed of the other rotor, but only that there shall be a change in the relative speed of the two gear-wheels 15 and 17. As the rotors of the two machines are normally in motion, there is comparatively little inertia resistance to changes in speed, and consequently the rotors respond quickly to changes in the frequency of the alternator.

What I claim as new, and desire to secure by Letters Patent of the United States, is—

1. The combination with an alternating-current circuit, of a motive device in operative relation thereto having a normally rotating member, automatic means for increasing the speed of said rotating member upon a decrease of frequency in said alternating circuit, and means for utilizing said change of speed to produce mechanical movement.

2. The combination with an alternating-current circuit, of a plurality of motive devices in operative relation thereto, a rotor for each of said motive devices, automatic means for changing the relative speed of said rotors upon a change of frequency in said alternating-current circuit, and means for utilizing said change of speed to produce mechanical movement.

3. The combination with a source of alternating current, of a plurality of motive devices connected thereto, a rotor for each of said motive devices, a field-winding for each of said motive devices, means for modifying the phase relation in said field-windings to cause rotation of said rotors, said means adapted to change the relative speed of said rotors upon a change in frequency of said current source, and means for utilizing said change in relative speed to produce mechanical movement.

4. The combination with a source of alternating current, of a prime mover mechanically connected thereto, means for supplying fluid to said prime mover, a plurality of motive devices electrically connected to said source of current, a rotor for each of said motive devices, means for causing said rotors to revolve at the same speed for a certain frequency of the current and to change relatively in speed upon a change of frequency, and means for utilizing said change of relative speed to vary the quantity of fluid supplied to said prime mover.

5. The combination with an alternating-current circuit, of a motive device connected thereto, automatic means for varying the speed of said motive device when the frequency of said circuit changes, a second motive device, and regulating means for utilizing a relative change of speed of said motive devices.

6. The combination with an alternating-current generator, of a prime mover connected thereto, a motive device electrically connected to said generator, automatic means for changing the speed of said motive device when the frequency of said circuit changes, a second motive device, means for rotating the same, a differential gear between said motive devices, and means operated by said differential gear for varying the speed of said prime mover.

7. The combination with an alternating-current circuit, of a motive device in operative relation thereto having a normally rotating member, a reactance for determining the normal speed of rotation of said member, automatic means for changing the speed of said rotating member upon a change of frequency in said alternating circuit, and means for utilizing said change of speed to produce mechanical movement.

In witness whereof I have hereunto set my hand this 4th day of October, 1904.

ERNEST SCHATTNER.

Witnesses:
HELEN ORFORD.
G. C. HOLLISTER.